United States Patent [19]
Benkmann

[11] 4,259,091
[45] Mar. 31, 1981

[54] ADIABATIC ADSORPTION METHOD FOR GAS PURIFICATION OR SEPARATION

[75] Inventor: Christian Benkmann, Munich, Fed. Rep. of Germany

[73] Assignee: Linde Aktiengesellschaft, Wiesbaden, Fed. Rep. of Germany

[21] Appl. No.: 76,359

[22] Filed: Sep. 17, 1979

[30] Foreign Application Priority Data

Sep. 16, 1978 [DE] Fed. Rep. of Germany ....... 2840357

[51] Int. Cl.³ .............................................. B01D 53/04
[52] U.S. Cl. ........................................... 55/25; 55/58
[58] Field of Search ................... 55/25, 26, 31, 58, 62, 55/179, 189, 190

[56] References Cited

U.S. PATENT DOCUMENTS

| 2,340,398 | 2/1944 | MacMullen | 55/58 |
| 3,176,444 | 4/1965 | Kiyonaga | 55/62 X |
| 3,338,030 | 8/1967 | Feldbauer | 55/25 |
| 3,923,477 | 12/1975 | Armond | 55/25 |
| 3,986,849 | 10/1976 | Fuderer | 55/25 |

Primary Examiner—John Adee
Attorney, Agent, or Firm—Karl F. Ross

[57] ABSTRACT

An adiabatic adsorption method for pressure-swing adsorbers, e.g. for gas purification or separation of components of a gas mixture, in which several switchable adsorbers are used in an adsorption phase followed by at least two pressure-relief stages and at least one pressure buildup stage with an intervening purging in the adsorption-desorption/regeneration cycle. According to the invention, at least one of the adsorbers is operated as an auxiliary adsorber by comparison with a main adsorber with a reduced contact time between the adsorption medium and gases in the auxiliary adsorber. This reduced contact time can result from a reduced adsorption-phase period by comparison with that of the main adsorber (reduced residence time) and/or by using a reduced charge of the adsorption medium in the auxiliary adsorber by comparison with that of the main adsorber.

8 Claims, 6 Drawing Figures

ADIABATIC ADSORPTION METHOD FOR GAS PURIFICATION OR SEPARATION

FIELD OF THE INVENTION

My present invention relates to a method of separating gas components in a gas mixture and/or purifying a gas mixture by adsorption and, more particularly, to a method of operating an adiabatic adsorption system utilizing a plurality of switchable adsorbers. The invention also relates to the apparatus operated by the latter method or for carrying out gas separation or purification.

BACKGROUND OF THE INVENTION

Adiabatic adsorption, in a mode known as "pressure-swing adsorption" is widely used for gas purification and separation because the desorption/regeneration phase does not require thermal energy but instead is effected by a pressure relief following the adsorption phase.

Thus it is known to provide a system or method for adiabatic adsorption in which a plurality of switchable adsorbers are cycled between an adsorption stage and a regeneration or desorption stage which can include at least two pressure-relief stages followed by a pressure-buildup stage and with intervening purging.

In such systems, the gases released by the pressure relief of the adsorption medium from one adsorber can be used for pressure equalization or pressure buildup in another adsorber.

The more adsorbers included in the system, the more pressure relief and pressure buildup stages are provided.

The advantages of such systems include better utilization of the pressure-relief gases, i.e. the gases remaining in the voids of the gas-permeable adsorption medium after conclusion of the adsorption phase.

Notwithstanding the numerous techniques which have utilized the pressure swing approach and the large number of systems which have been developed based thereon, it has been found that the economy of the system still leaves much to be desired and that there is not always an optimum utilization of the apparatus.

OBJECTS OF THE INVENTION

It is the principal object of the present invention to provide an adiabatic adsorption method of gas separation or gas purification which eliminates at least some of the disadvantages of earlier systems and is more economical and hence more energy efficient than earlier systems.

Another object of this invention is to provide an improved method of operating a pressure-swing adsorption installation or apparatus.

It is also an object of my invention to improve upon the utilization of multiple-adsorber installations utilizing the pressure-swing technique and plural pressure-relief stages in the regeneration of the adsorption medium.

SUMMARY OF THE INVENTION

These objects and others which will become apparent hereinafter are attained in accordance with the present invention, in an adiabatic adsorption system utilizing a plurality, preferably a multiplicity, of switchable adsorbers undergoing, in each cycle, an adsorption phase and a regeneration phase, with the regeneration phase including at least two pressure-relief stages followed by a pressure-buildup stage with at least one intervening purging stage. According to the invention, at least one of the adsorbers is operated as an auxiliary adsorber (by comparison with one or more other adsorbers acting as main adsorbers) in that the contact time between the gases and the medium in the auxiliary adsorber is less than the contact time in a main adsorber. More specifically, the adsorption phase period (residence time) of the auxiliary adsorber is reduced by comparison with that of a main adsorber or a reduced charge of adsorption medium is provided in the auxiliary adsorber (by comparison with that of a main adsorber) and the adsorption phase duration is shortened.

While the pressure-swing adsorption techniques used heretofore always used equivalent switchable adsorbers, i.e. all of the switchable adsorbers operated in the same manner, the present invention provides auxiliary adsorbers in number which can be in an arbitrary ratio to the number of main adsorbers, and which are functionally distinct from the main adsorbers by virtue of the reduced contact time.

Surprisingly, the provision of auxiliary adsorbers, with less adsorption capacity than the main adsorbers, does not result in a reduction of efficiency but rather increases the versatility and variation possibility of switching within the adsorber installation and thereby improves the economy of the system and ensures a more effective utilization of the main adsorber space as well.

An important aspect of the present invention is that the auxiliary adsorbers are operated with a shortened adsorption phase (by comparison with that of the main adsorbers) and thus a reduced residence time. In addition the quantity of adsorption medium within the auxiliary adsorber can be significantly less than that of the main adsorber and hence the auxiliary adsorber can be of smaller size or quantity.

According to a feature of the invention, the or each auxiliary adsorber can be operated with a shortened period or cycling time. This is particularly advisable when the number of main adsorbers exceeds the number of auxiliary adsorbers. The reduction in operating period of the auxiliary adsorber in comparison to that of the main adsorber makes the method of the present invention substantially more versatile than earlier systems. It is particularly advantageous to halve the period of operation or cycle time of the auxiliary adsorber so that the main adsorber will have a period duration twice that of the auxiliary adsorber.

According to another feature of the invention, at least one of the pressure-relief and/or pressure buildup stages of the main and/or auxiliary adsorbers is operated with pressure equalization with the other adsorber type. This pressure equalization should be ensured not only between pressure-relief and pressure-buildup stages of the main adsorbers but also within the group of each of two groups being functionally interchanged as required.

It has also proven to be desirable to use a pressure-relief gas from at least one of the pressure relief stages of main and/or auxiliary adsorbers as a purging, sparging or scavenging gas for an adsorber of the other type. Thus both adsorber types are fully integrated into the overall system.

Utilizing the principles of the present invention, there are numerous timing relationships or cycles of the adsorption phases which can be employed under various circumstances.

For example, it has been found to be desirable in some cases to have the adsorption phases of the main adsorber temporally overlapped at the beginning and end by the adsorption phases of other main adsorbers, with the adsorption phases of the auxiliary adsorbers being switched directly between the overlapping period.

For an adsorption-phase period of a first main adsorber, therefore, two additional main adsorbers can be assigned to the first so that, during a certain period after the start of the adsorption phase of the first, the adsorption phase of one of the two assigned adsorbers is not yet terminated while the adsorption phase of the other of these two assigned main adsorbers commences before the termination of the adsorption phase of the first.

Thus there are two overlap periods, separated temporally from one another by an intervening period in which only the first adsorber is in adsorption phase. In order to ensure continuity of the method, one of the auxiliary adsorbers is switched to its adsorption phase during this period. This auxiliary adsorber takes up the flow from the initial overlapping assigned adsorber and is then succeeded by the other assigned main adsorber.

In another desirable mode of operation with respect to the timing of the adsorption phases, the adsorption phases of successively effective main adsorbers do not directly follow in time succession and adsorption phases of respective auxiliary adsorbers are interposed during the intervals between the adsorption phases of the main adsorbers. In this case, two main adsorbers are temporarily assigned to an auxiliary adsorber whose adsorption phase bridges the temporally spaced adsorption phases of the two main adsorbers.

It can thus be seen that, while known pressure-swing adsorption systems have all adsorbers run through identical switchover cycles which are only phase shifted relative to one another, the method of the present invention enables the switch-over cycles within the group of auxiliary adsorbers and within the group of main adsorbers, or between adsorber of both groups, to deviate from each other. This is especially advantageous where the number of main adsorbers forms an odd-number ratio to the number of auxiliary adsorbers and dead times are avoided and the use of product gas for purging or sparging is to be excluded.

The method of the present invention has been found to be particularly effective with adsorption systems with a multiplicity of adsorbers although it is applicable to systems using as few as three adsorbers, e.g. in an improvement on the three-adsorber system of U.S. Pat. No. 3,338,030.

This patent describes three cyclically switchable equivalent adsorbers which run through adsorption and regeneration phases in succession with the regeneration phase being subdivided into five steps or stages, utilizing the terminology introduced above.

The five stages are the two pressure-relief stages, a purging stage and two pressure-buildup stages.

During the first pressure-relief stage of an adsorber, one of the two other adsorbers is in the first pressure-buildup stage and the gas extracted during the first pressure-relief stages is used for pressure equalization with the adsorber in the first pressure-buildup stage.

The quantity of gas produced during the second pressure-relief stage is discharged as a residual gas and purging is effected with product gas. The first pressure-buildup stage thus makes use of gas from the first pressure-relief stage and derived from the third adsorber while crude gas or product gas can be used for the final pressure-buildup stage in each cycle.

This system has been found to result in poor utilization of the interstitial gases of the adsorber after termination of the adsorption phase. Only the quantity of gas evolved by the first relief is used further, namely for pressure equalization with the first pressure-buildup stage of another adsorber. The remaining volume of gas in the interstices of the adsorber is discharged and the pressure buildup which can be attained in this fashion is insufficient. The arrangement has the further disadvantage that it requires product gas for purging unless an inert, foreign or other scavenging gas is available. Of course the product gas used for purging, once contaminated, must also be discarded so that the product yield is lower than is desired.

These disadvantages are completely eliminated with the system of the present invention which, in the case of a three-adsorber arrangement, allows two adsorbers to be used as main adsorbers and the remaining adsorber to be used as an auxiliary adsorber. The auxiliary adsorber operates with an adsorption phase whose duration is only half that of the main adsorber and with a half period, i.e. a cycling time which is half that of the cycling time of the main adsorbers. The gas released during the first pressure-relief phase of the auxiliary adsorber purges one of the two main adsorbers while the gas from the pressure-relief stage of one of the main adsorbers is used for the pressure buildup of the other main adsorber.

The improvement with the system of the present invention applied to this three-adsorber system is particularly due to the fact that no product gas has to be branched off for purging the main adsorbers, but rather the gas obtained during the first pressure-relief stage of the auxiliary adsorber can be used as the purging gas for the main adsorbers.

This is especially favorable when relatively large amounts of purging gas are needed, because the adsorbed components are difficult to desorb. The pressure of the auxiliary adsorber can be lowered during the first pressure-relief stage significantly more than is possible in the case of the main adsorbers, because the auxiliary adsorber during this step is connected with the main adsorber at the lowest process pressure. During the first pressure-relief stage the pressure in the auxiliary adsorber can thus almost be lowered to the pressure prevailing in the corresponding main adsorber during purging.

Thus, in case of need, almost the entire void space gas of the auxiliary adsorber can be used effectively instead of product gas.

After termination of the adsorption phase of a main adsorber, the auxiliary adsorber takes over the crude gas, and when this has terminated its adsorption phase, which is substantially shorter than that of the main adsorber, the crude gas is taken over by the second main adsorber. From this, switching is done back to the auxiliary adsorber and then to the first main adsorber.

According to another embodiment of the invention, with three adsorbers, the pressure relief of the auxiliary adsorber is completed in at least three pressure-relief stages and the gas fraction obtained during the second pressure-relief stage is used in the first pressure buildup stage of the main adsorber purged during the first pressure-relief stage.

This variation is especially useable when the purging gas amount needed for one main adsorber is smaller than in the above-described case. Also, this embodiment of the invention proves to be advantageous, since the gas left in the void space of the auxiliary adsorber is better utilized here than with the known method, namely on the one hand for direct saving of product gas for purging purposes and on the other hand due to very extensive lowering of the pressure during the second pressure-relief stage, without the obtained residual gas being lost.

The described special variation of the method according to the invention represents a considerable improvement of the adsorption method working with three adsorbers. Heretofore, an increased product yield could be achieved in such a case only by an increase of the number of adsorbers, which involved a considerable additional expenditure. Moreover, with an increased number of adsorbers an adsorption installation is always more complicated and subject to failure. The disadvantages of this type are avoided in a simple and economical manner with the aid of the various embodiments of the invention.

The method according to the invention can be used for cleaning crude hydrogen, for separating acid gases from synthetic gases, for removing individual hydrocarbons from gaseous hydrocarbon mixtures and for obtaining oxygen from air.

It is, therefore, useable in all cases where gaseous or vapor components with sufficiently different adsorbability are to be separated from each other. Likewise, all the conventional adsorption media can be used within the framework of the method of the invention, thus for example silica gel, activated alumina, active carbon, zeolitic molecular sieves or carbon molecular sieves.

SPECIFIC DESCRIPTION AND EXAMPLES

Figure 1:
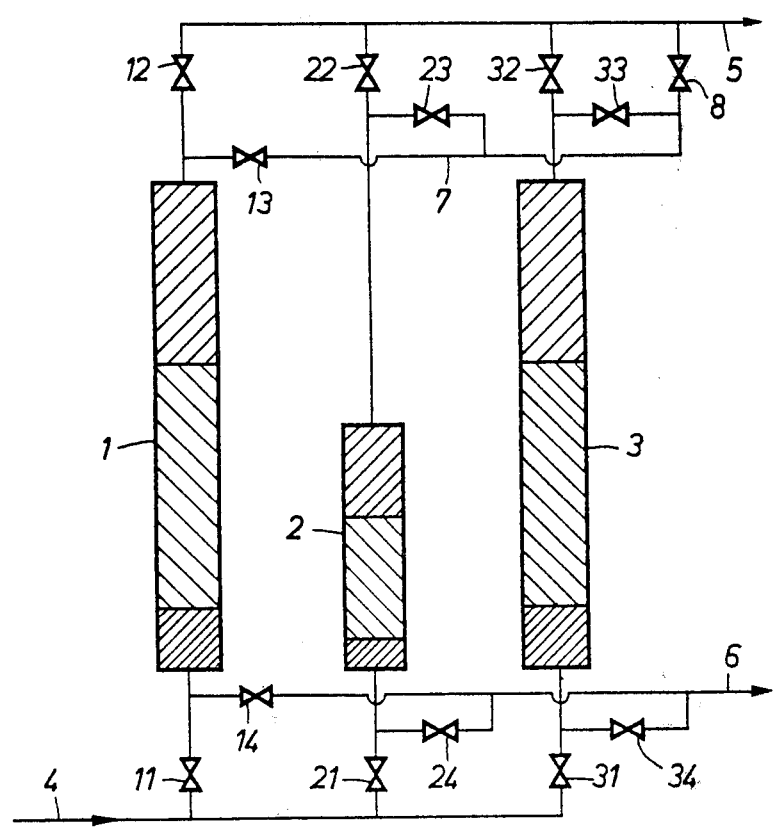
FIG. 1 is a schematic representation of an adsorption installation consisting of two main adsorbers and an auxiliary adsorber for carrying out a method according to the invention.

FIG. 1 shows main adsorbers 1 and 3 an an auxiliary adsorber 2. The inlet ends of the adsorbers are connected by valves 11, 21 and 31 with the line 4 for crude gas. The outlet ends of the adsorbers are connected by valves 12, 22 and 32 with the discharge line 5 for the purified product gas.

The line 7 connected by valve 8 with the product gas line 5 serves for branching off the product gas fractions as well as for feeding in same into the outlet ends of the adsorbers by valves 13, 23 and 33. Contaminated residual gases are drawn off by valves 14, 24 and 34 as well as line 6 from the inlet ends of the adsorbers.

A crude gas consisting of 71 vol% of hydrogen, 2.5 vol% of methane, 13 vol% of carbon monoxide and 13.5 vol% of carbon dioxide is to be treated to yield 6.7 kMol/h hydrogen with a purity of 99.99 vol.%.

The three adsorbers 1, 2 and 3, seen from the inlet ends, are each filled with three subsequent layers of different adsorption media: a first layer made of activated alumina, which serves as adsorption medium for water traces, a second layer of active carbon for holding back the methane and the carbon dioxide and a third layer made of a zeolitic molecular sieve 5A for adsorption of the carbon monoxide.

The adsorber containers have diameters of 0.8 m, the main adsorbers 1 and 3 each have a filling height of 4.1 m and the auxiliary adsorber a filling height of 2.1 m.

The main adsorbers contain a total of 1,300 kg each, the auxiliary adsorber exhibits a total of 660 kg adsorption medium.

Figure 2:
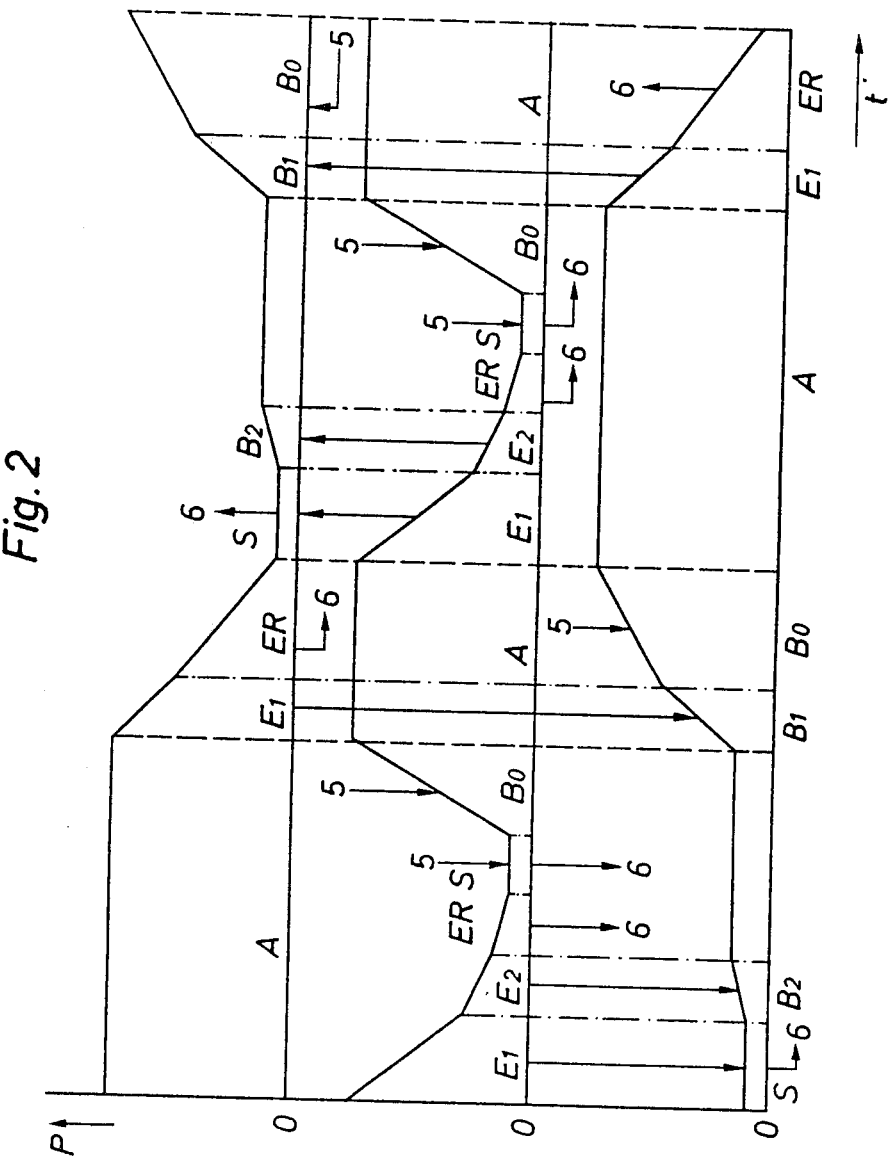
FIG. 2 is a pressure-time diagram for the mode of operation of FIG. 1.

The time-cycle of the method variation should be clarified with the aid of the pressure-time diagram of FIG. 2. In this figure, the upper curve refers to the main adsorber 1, the middle curve refers to the auxiliary adsorber 2 and the lower curve refers to the other main adsorber 3. The pressure p is plotted against the time t.

At the start, the main adsorber 1 is in adsorption phase A. The crude gas flows through line 4 and the open valve 11 into adsorber 1, it is freed there from water traces, methane, carbon dioxide and carbon monoxide and leaves the installation as highly pure hydrogen over open valve 12 through line 5. The adsorption pressure is 15 bar, the temperature of the crude gas is 303° K.

At the start of the adsorption phase A of the main adsorber 1, the auxiliary adsorber 2 has terminated its adsorption phase. The auxiliary adsorber now enters into the first pressure-relief stage E1. It is unloaded to a pressure of 6 bar concurrently with open valve 23, the outflowing gas volume flowing through line 7 and the open valve 33 into the main adsorber 3 being at the lowest process pressure of 1.7 bar, i.e. the desorption or scavenging pressure. By that means the adsorbed components in the main adsorber 3 are desorbed in countercurrent from the outlet end, which is connected over open valve 34 with residual gas line 6, while maintaining said lowest pressure.

After reaching the intermediate pressure of 6 bar in the auxiliary adsorber 2, the valve 34 is closed, whereby the gas flowing out from the auxiliary adsorber leads to a pressure increase in the main adsorber 3. The equalization pressure is 3.1 bar.

As soon as this is reached, the flow ceases and the main adsorber 3 is isolated up to the end of the adsorption phase of the main adsorber 1 by closing of valve 33. With a closed valve 23 and open valve 24, the auxiliary adsorber 2 is subsequently subjected to a third and last pressure-relief stage ER down to a pressure of 1.7 bar. The released gas fraction is likewise drawn off over residual gas line 6. Then, with open valves 23 and 8, the auxiliary adsorber is subjected to a purging S with product gas branched off from line 5. This occurs with open valve 24 from the inlet end maintaining a pressure of 1.7 bar. Finally, the auxiliary adsorber 2 is brought to the adsorption pressure of 15 bar in a single pressure buildup stage BO with a now closed valve 24 with the aid of product gas.

While the main adsorber 1 runs through its adsorption phase, the auxiliary adsorber 2 is completely regenerated, main adsorber 3 at the same time running through only a partial section of its regeneration phase, namely scavenging or purging phase S and the first pressure buildup phase B2.

Subsequently, the auxiliary adsorber 2 takes over the crude gas with open valves 21 and 22. The main adsorber 1, whose adsorption phase is now terminated, with closed valves 11, 12 and 14, and open valves 13, and 33, is now connected over line 7 with the main adsorber 3. Closed valves 31, 32 and 34 provide that a pressure equalization can take place between the main adsorber 1 at 15 bar and the main adsorber 3 at the lowest intermediate pressure of 3.1 bar. This leads to an equalization pressure of 9.4 bar.

After pressure equalization has taken place, corresponding to the first pressure-relief stage E1 of the main adsorber 1 and the second pressure buildup stage B1 of the main adsorber 3, valve 13 is closed and valve 8 is opened. The main adsorber 1 is discharged during its second pressure-relief stage ER over the now opened valve 14 and the residual gas line 6 to the lowest process pressure of 1.7 bar, while the main adsorber 3 at the same time is brought to the adsorption pressure of 15 bar in its third and last pressure buildup stage BO with the aid of branched off product gas.

Now, the main adsorber 3 can take over the crude gas while the auxiliary adsorber runs through its regeneration phase with purging S of the main adsorber and pressure equalization E2/B2 with the same, which is terminated at the same time as the adsorption phase of the main adsorber 3.

The further, periodically repeating cycle becomes clear with the aid of the pressure-time diagram of FIG. 2. The recycling period is about 20 minutes for main adsorbers 1 and 3 and about 10 minutes for auxiliary adsorber 2.

The yield of pure hydrogen amounts to 58% according to this method. On the other hand, for the same case of use, a yield of about 45 to 50% hydrogen can be reached with a conventional installation which operates with three equal adsorbers and the same switching cycles according to the above mentioned previously known method of the mentioned U.S. patent.

Figure 3:
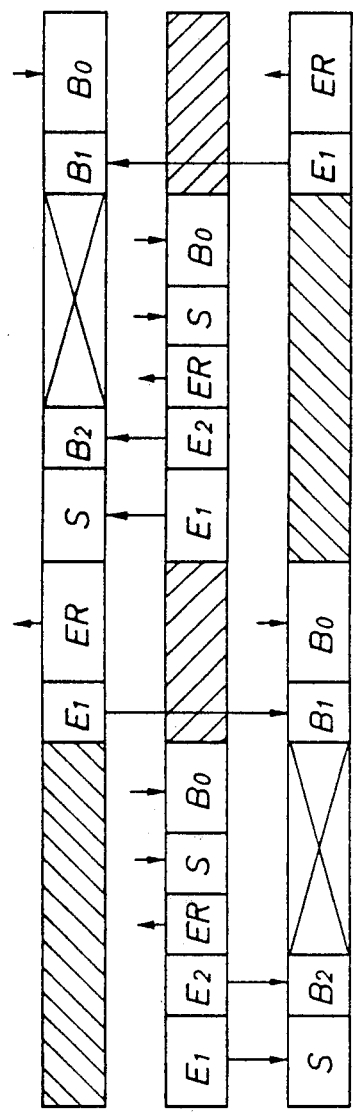
FIG. 3 is a time-cycle diagram for the embodiment of FIG. 1.

The time-cycle diagram of FIG. 3 shows how the switching cycles of the main as well as of the auxiliary adsorbers run in and in what manner the three adsorbers are functionally connected with each other.

The auxiliary adsorber is represented by the middle bar, the main adsorbers are represented by the upper as well as the lower bar. The adsorption phases are shown hatched, the dead phases in which the main adsorbers are completely isolated, are represented by diagonal crossed lines.

The pressure-relief gas flows flow in the direction of the arrows, actually coming from pressure relief stage E1, E2 and a arriving in a pressure buildup stage B1, B2 or a purging stage S.

The gas actually flowing out during the last pressure relief stage ER arrives in the residual gas line. The purging S of the main adsorber as well as the last pressure buildup BO of all three adsorbers take place with product gas. The time runs from left to right.

Figure 4:
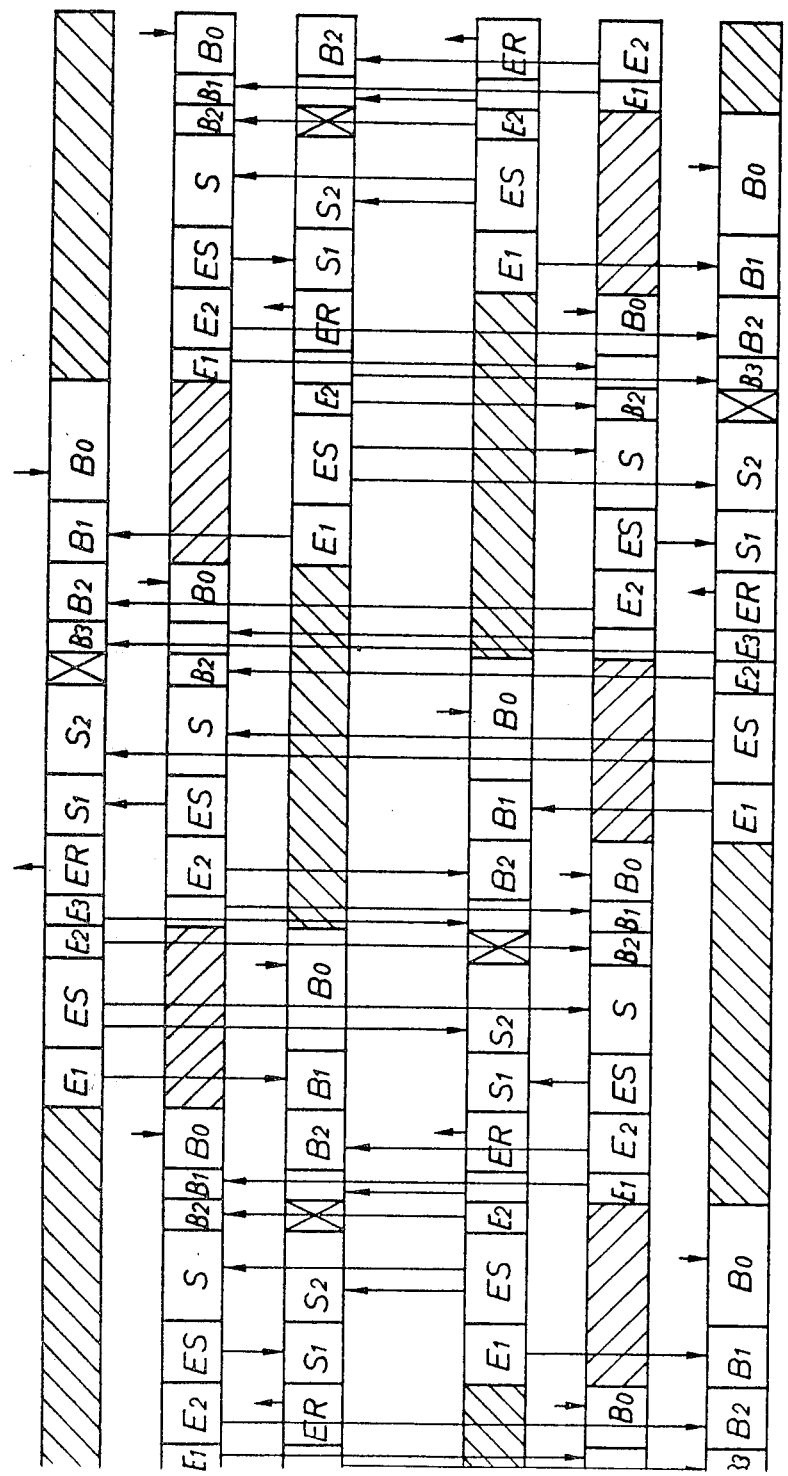
FIG. 4 is a time-cycle diagram of a method according to the invention for four main and two auxiliary adsorbers.

FIG. 4 is a time-cycle diagram of another variation of the process, which by way of apparatus corresponds to a doubling of the above described method working with two main adsorbers and an auxiliary adsorber. Nevertheless, a special performing of the method exists here which is integrated to a higher degree compared with the above described method. With all the adsorbers, the product gas is used only for the last pressure buildup phase BO. All the adsorbers are purged with pressure relief gas, and the amount of gas given off during the last pressure relief stage ER in the residual gas line is greatly reduced, because on the one hand the last pressure relief no longer occurs in the residual gas line with the auxiliary adsorbers and on the other hand the pressure relief gas of the main adsorber is used down to very low pressures for pressure buildup and purging of other adsorbers before stage ER sets in.

Of the three upper as well as the three lower bars of FIG. 4, the middle bars actually correspond to the auxiliary adsorbers, while the other four bars correspond to the main adsorbers. All four main adsorbers as well as both auxiliary adsorbers run through identical switching cycles. Within both triad groups, the adsorption phases of the auxiliary adsorber actually lie timewise between the adsorption phases of both main adsorbers.

The gas generated during the last pressure-relief stage ES of the auxiliary adsorber serves for purging the main adsorber during a primary purging phase S1. The pressure relief gas of the pressure relief stage ES following the pressure-relief stage E1 of the main adsorbers is used for purging a main as well as an auxiliary adsorber. This occurs in parallel switching during the purging phases S2 and S.

While the method variation of FIGS. 1 through 3 is characterized by especially good utilization of the pressure relief gas of the auxiliary adsorber, the degree of utilization of the method variation according to FIG. 4 is almost balanced in the case of the main and auxiliary adsorbers. The pressure relief gases of the auxiliary adsorbers, which flow out during the entire three pressure relief stages E1, E2 as well as ES, are used completely for the pressure buildup or purging of other adsorbers, while the gases exiting from all five pressure-relief stages E1, ES, E2, E3 as well as ER of the main adsorbers are likewise used for the named purposes with the exception of the last pressure relief step ER.

Figure 5:
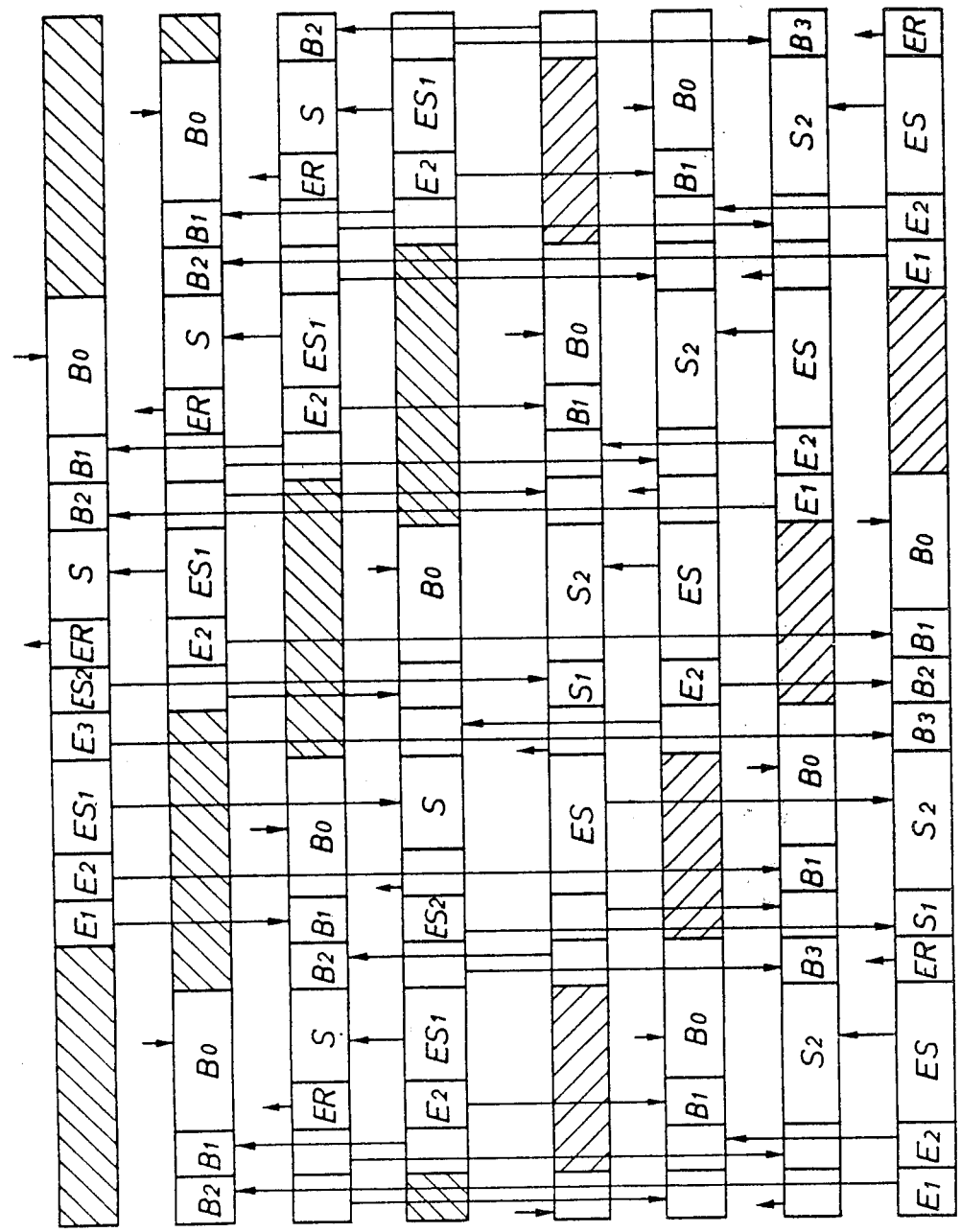
FIG. 5 is a time-cycle diagram of a method for use with four main and four auxiliary adsorbers.

The method shown in the time-cycle diagram of FIG. 5 is operated with four main and four auxiliary adsorbers. Both adsorber groups are represented by the four upper and the four lower bars. The adsorption phases of the main adsorbers overlap each other at the phase beginning as well as at the phase ending.

The adsorption phases of the auxiliary adsorbers are switched between the overlapping periods of the adsorption phases of the main adsorbers. This method gives a higher product yield compared with the method variation according to FIG. 4.

The pressure relief gases are all used more effectively, since the number of pressure-relief stages for the main and auxiliary adsorbers is increased from five and three now to six and four, respectively. The amount of product gas needed during the last pressure buildup phase BO is correspondingly reduced. The main and auxiliary adsorbers run through identical switching cycles here.

Figure 6:
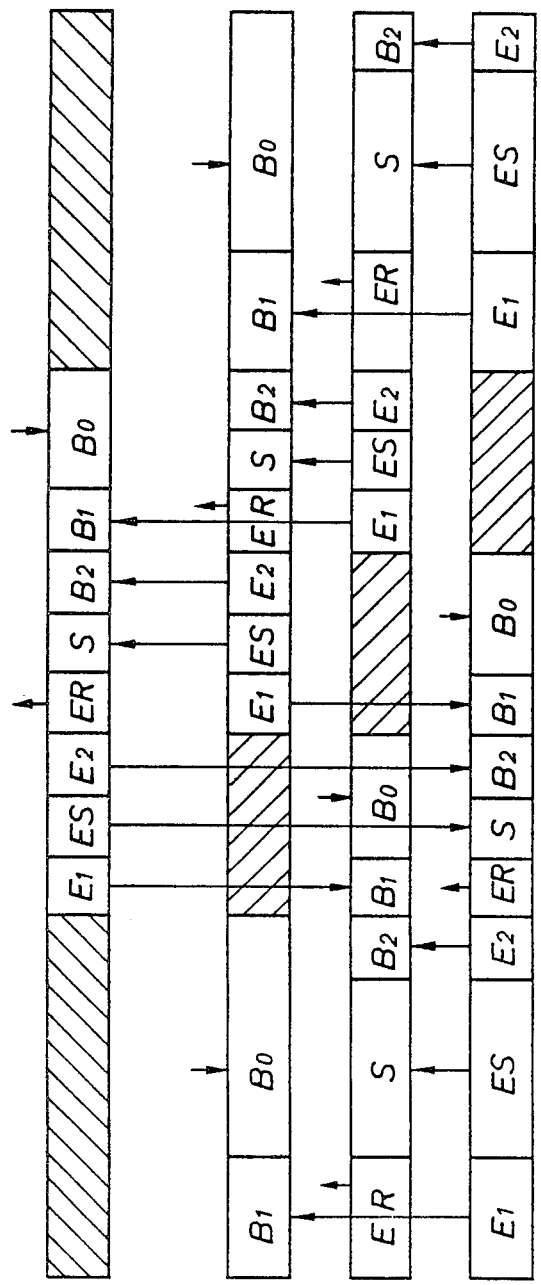
FIG. 6 is a time-cycle diagram of a method for one main and three auxiliary adsorbers.

The method variation according to FIG. 6 distinguishes itself with regard to number of adsorbers by a preponderance of auxiliary adsorbers. The upper bar represents the single main adsorber, the three lower bars represent the three auxiliary adsorbers. The adsorption phases of all three auxiliary adsorbers are switched in succession between two adsorption phases of the main adsorber. With both adsorber types, the gas flowing off during the last ER stage of all four pressure-relief stages is conducted into the residual gas line. Product gas is needed only for the last pressure buildup BO. The three auxiliary adsorbers run through different switching cycles, since otherwise dead times occur and the product gas must be used for purging.

I claim:

1. In an adiabatic gas-adsorption method wherein a plurality of adsorbers are switchable through cycles including a regeneration phase and an adsorption phase and in which each regeneration phase includes at least two pressure-relief stages, at least one pressure-buildup stage and a purging stage, the improvement in which said adsorbers are at least three in number and are functionally subdivided into a main group and an auxiliary group, said main group including at least one main adsorber and said auxiliary group including at least one auxiliary adsorber, and said auxiliary adsorber is operated with a contact time of a gas during its adsorption phase with its adsorbent which is less than the adsorption time of the main adsorber, at least one adsorber of one group in a pressure-relief or pressure-buildup stage being connected to an adsorber of the other group in a pressure-buildup or pressure-relief stage respectively for pressure equalization therebetween, and purge gas generated during a pressure-relief stage of an adsorber of one of said groups being used to scavenge an adsorber of the other of said groups during the purging stage thereof.

2. The improvement defined in claim 1 wherein the residence time of the gas in the auxiliary adsorber during the adsorption phase thereof is less than the residence time of the gas in the main adsorber during the adsorption phase thereof.

3. The improvement defined in claim 1 wherein said auxiliary adsorber contains less adsorbent than said main adsorber.

4. The improvement defined in claim 1, claim 2 or claim 3 wherein the cycling period of said auxiliary adsorber is less than that of said main adsorber.

5. The improvement defined in claim 1 wherein said main group includes at least three main adsorbers with a first of said adsorbers having an adsorption phase temporally overlapped by the adsorption phases of the two other main adsorbers with the overlap periods being temporally spaced apart, said auxiliary adsorber being operated in its adsorption phase in the interval between said overlap periods.

6. The improvement defined in claim 1 wherein a plurality of main adsorbers are provided and are operated with temporally spaced adsorption phases, said auxiliary adsorber having its adsorption phase in an interval between adsorption phases of the main adsorbers.

7. The improvement defined in claim 1 wherein two main adsorbers and one auxiliary adsorber are provided, the cycling period of the auxiliary adsorber being half the cycling period of the main adsorbers, the gas produced by pressure relief of the auxiliary adsorber during a first pressure-relief stage thereof being supplied to one of the main adsorbers during the purging stage thereof and gas from a first pressure-relief stage of the latter main adsorber being fed to the other main adsorber for the pressure buildup thereof.

8. The improvement defined in claim 7 wherein pressure relief is effected for said auxiliary adsorber in at least three pressure-relief stages, the gas recovered during the second pressure-relief stage of said auxiliary adsorber being fed to the first-mentioned main adsorber during a first pressure-buildup stage thereof.

* * * * *